United States Patent
Yuan et al.

(10) Patent No.: US 9,369,376 B2
(45) Date of Patent: Jun. 14, 2016

(54) METHOD ENABLING FAST SWITCHING BETWEEN MULTICAST TREES

(75) Inventors: Song Yuan, Beijing (CN); Mingchao Shao, Beijing (CN); Giovanni Mumolo, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 236 days.

(21) Appl. No.: 14/353,202

(22) PCT Filed: Oct. 21, 2011

(86) PCT No.: PCT/CN2011/001749
§ 371 (c)(1),
(2), (4) Date: Dec. 8, 2014

(87) PCT Pub. No.: WO2013/056399
PCT Pub. Date: Apr. 25, 2013

(65) Prior Publication Data
US 2015/0163130 A1   Jun. 11, 2015

(51) Int. Cl.
| H04L 1/00 | (2006.01) |
| H04L 12/703 | (2013.01) |
| H04L 12/761 | (2013.01) |
| H04L 12/723 | (2013.01) |
| H04L 12/18 | (2006.01) |
| H04L 12/26 | (2006.01) |

(52) U.S. Cl.
CPC ............ *H04L 45/28* (2013.01); *H04L 12/1863* (2013.01); *H04L 43/0847* (2013.01); *H04L 45/16* (2013.01); *H04L 45/50* (2013.01)

(58) Field of Classification Search
CPC .......... H04L 45/28; H04L 45/29; H04L 45/30
USPC .................................. 370/216–218, 221, 225
See application file for complete search history.

(56) References Cited

U.S. PATENT DOCUMENTS

| 5,724,358 A * | 3/1998 | Headrick ............ H04L 12/5601 370/418 |
| 6,442,708 B1 | 8/2002 | Dierauer et al. |
| 8,004,960 B2 | 8/2011 | Raj |

(Continued)

FOREIGN PATENT DOCUMENTS

| CN | 1933448 A | 3/2007 |
| CN | 101170459 A | 4/2008 |

(Continued)

OTHER PUBLICATIONS

Zhang, Wen, International Search Report, The State Intellectual Property Office, the P.R. China, Jul. 16, 2012.

(Continued)

*Primary Examiner* — Dady Chery
(74) *Attorney, Agent, or Firm* — Ericsson Inc.

(57) ABSTRACT

Presented are a system and method of detecting a multicast tree link failure and performing a fast switch from the failed multicast tree communication path to a secondary multicast tree communication path. The methods are suitable for leaf nodes in a multiprotocol label switching network. The method generates a count of communication path failure detection packets and a count of communication path failure detection packets plus other packets and compares the counts to determine the status of the link. The system includes two counter components and a comparison component.

21 Claims, 4 Drawing Sheets

(56) References Cited

U.S. PATENT DOCUMENTS

| | | | | |
|---|---|---|---|---|
| 8,289,883 | B2* | 10/2012 | Zhu | H04L 12/18 370/238 |
| 2005/0169182 | A1* | 8/2005 | Klink | H04L 12/56 370/236.2 |
| 2009/0262651 | A1 | 10/2009 | Liu | |
| 2009/0274042 | A1* | 11/2009 | Asati | H04L 12/185 370/225 |
| 2010/0238940 | A1* | 9/2010 | Koop | H04L 45/122 370/400 |
| 2010/0251037 | A1* | 9/2010 | Cao | H04L 41/06 714/57 |

FOREIGN PATENT DOCUMENTS

| | | |
|---|---|---|
| CN | 102075390 A | 5/2011 |
| JP | 200480532 A | 3/2004 |

OTHER PUBLICATIONS

Faloutsos M et al., "An Architecture for Scalable, Efficient, and Fast Fault-Tolerant Multicast Provisioning" IEEE Network, IEEE Service Center: NY, US (Mar./Apr. 2004) vol. 18, No. 2, pp. 26-34.

EESR Extended European Search Report from corresponding application EP/11874167.

* cited by examiner

METHOD ENABLING FAST SWITCHING BETWEEN MULTICAST TREES

TECHNICAL FIELD

The present invention relates generally to a Multiprotocol Label Switching (MPLS) mechanism of communications over a multicast tree and more specifically to performing fast switching between different multicast trees.

BACKGROUND

With market pressure driving ever expanding service offerings, telecommunication operators are offering a service combination known as Triple-Play services. Triple-Play services combine high-speed internet access, television programming and voice over internet protocol (VOIP) communications. In an effort to reliably provide these services, telecommunication operators have implemented multiprotocol label switching (MPLS) multicast trees to deliver the services to the end users. FIG. 1 illustrates a prior art MPLS network 102 connected to an internet protocol (IP) core network 104, providing the media source, and a digital line subscriber access multiplexer (DSLAM) 106. The MPLS network includes root nodes 108 (connected to routers 114 on the IP network), leaf nodes 110 (connected to a DSLAM), and routers 112 connecting the MPLS root nodes 108 to the MPLS leaf nodes 110.

Typically, telecommunication providers employ over-provisioning techniques for redundancy by delivering the same content, from multiple root nodes, over several multicast trees to a set of routers/switches, the leaf nodes, positioned at the edge of the MPLS network. Under normal operating conditions, the router/switch leaf nodes receive the communications from a primary tree with another tree acting as a secondary or backup communication path. If the primary tree fails, then the secondary tree can step in and deliver the content from a root node to the leaf nodes.

Detecting a primary tree failure is typically accomplished with a Bidirectional Forward Detection (BFD) mechanism to reduce the time required for detection. In a typical prior art embodiment, a BFD transmitter is installed on the root node of each multicast tree and the BFD packets are replicated to each of the leaf nodes of the multicast tree. In this embodiment, each leaf node detects the failure of a path, or the source, by monitoring the arrival of the incoming BFD connectivity detection packets.

The existing BFD solutions to detecting a tree failure have two drawbacks related to failures upstream of the root node. In the case of the first failure, a failure between the MPLS network and Internet Protocol (IP) network, a leaf node cannot detect the failure because the BFD mechanism is still operational. Consequently, the failure must be detected by MPLS signaling mechanism such as Targeted Label Distribution Protocol (T-LDP) or static Pseudowires (PW) status signaling. Implementing these additional MPLS signaling mechanisms increases both the development and the maintenance costs for a system capable of delivering real-time content with acceptable levels of recovery.

In the case of the second and more damaging failure, a failure in the IP core network, the detection of the communications failure and the subsequent recovery from the failure will rely on IP resiliency. The issue associated with this type of recovery mechanism is the time required for the IP resiliency mechanism to detect the failure and respond. This long-standing mechanism cannot meet the fast service recovery time of less than fifty milliseconds as required by the services provided in a "Triple-Play" package.

Accordingly, market pressure is building for a method and system capable of providing a deterministic communication failure detection and recovery in an MPLS system of less than fifty milliseconds. It is desirable that the method and system not require any signaling facilities associated with the MPLS network.

SUMMARY

According to one exemplary embodiment, a method for switching a communication path between multicast trees generates a first count, during a predefined interval, of the communication path failure detection packets arriving at a leaf node. In another aspect of the exemplary embodiment, the method generates a second count, during the predefined interval, of the communication path failure detection packets and other packets arriving at the leaf node. In another aspect of the exemplary embodiment, the method compares the first count to the second count and if the second count is within a predefined value of the first count then the method acts to switch the communication path to a secondary multicast tree.

In another exemplary embodiment, a node on a network minimizes the time required to detect the loss of communication on a multicast tree. The node includes a processor, memory and computer instructions stored in the memory for a first counter component for counting the arrival of communication path failure detection packets at the node over a predefined interval, a second counter component for counting the arrival of the communication path failure detection packets and other packets arriving at the node over the predefined interval and a comparison component for comparing a first count associated with the first counter component with a second count associated with the second counter component and sending a request to switch to a second multicast tree when the difference between the first count and the second count is a predefined value.

In another exemplary embodiment, a system for protecting a communication path from a root node to a leaf node in a multiprotocol label switching (MPLS) network is described. The system includes a plurality of MPLS root nodes connected to a plurality of routers associated with another network, a plurality of MPLS leaf nodes connected to a plurality of DSLAMS with each leaf node further comprising a processor for executing computer instructions and a memory for storing computer instructions with the computer instructions further comprising a first counter component for counting the arrival of communication path failure detection packets at the node over a predefined interval, a second counter component for counting the arrival of the communication path failure detection packets and other packets arriving at the node over the predefined interval and a comparison component for comparing a first count associated with the first counter component with a second count associated with the second counter component and sending a request to switch to a second multicast tree when the difference between the first count and the second count are within a predefined range, and a plurality of MPLS routers connecting the plurality of leaf nodes to the plurality of root nodes.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
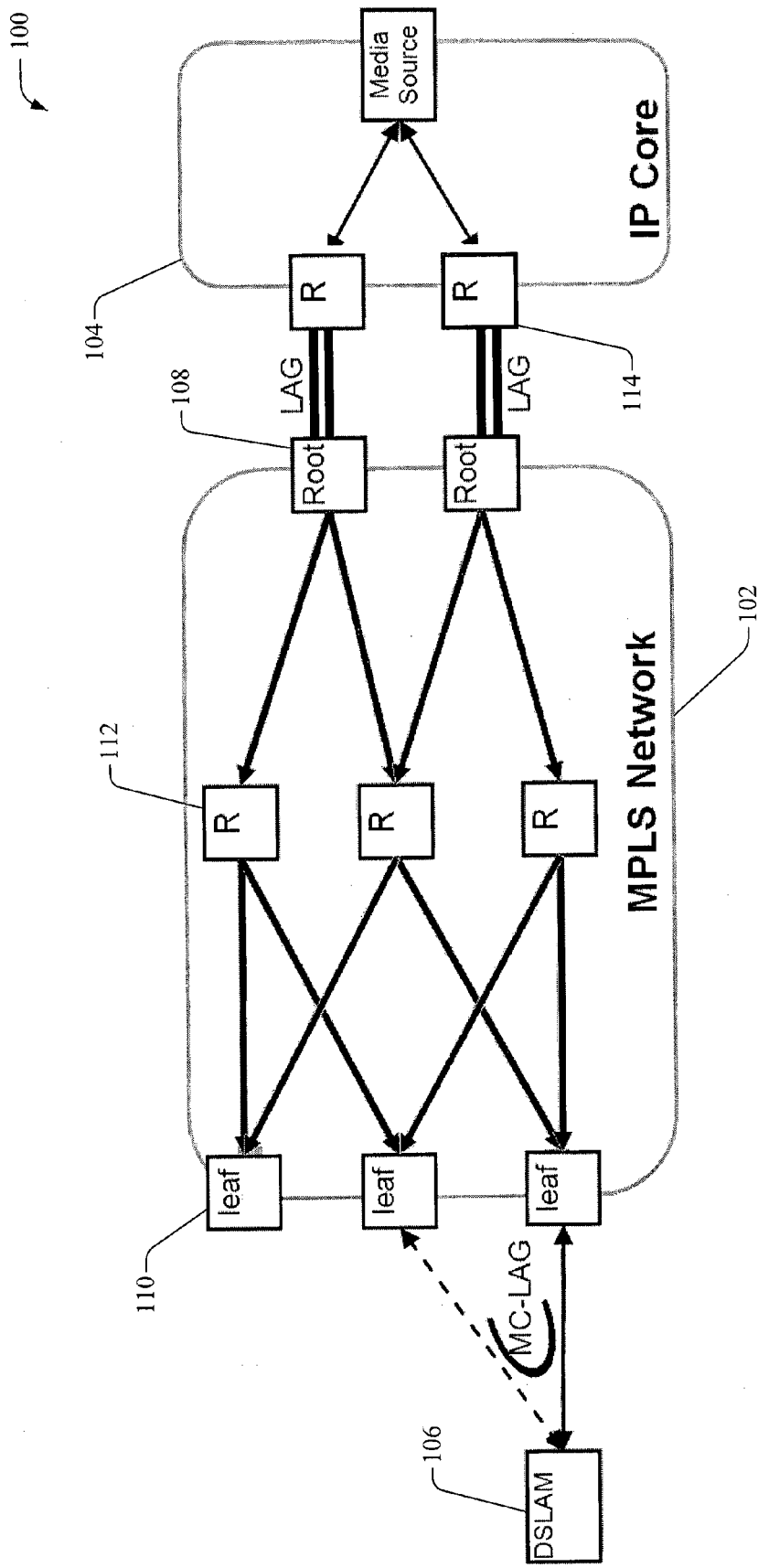
FIG. 1 depicts a prior art network providing a plurality of communication paths between multicast trees.
Figure 2:
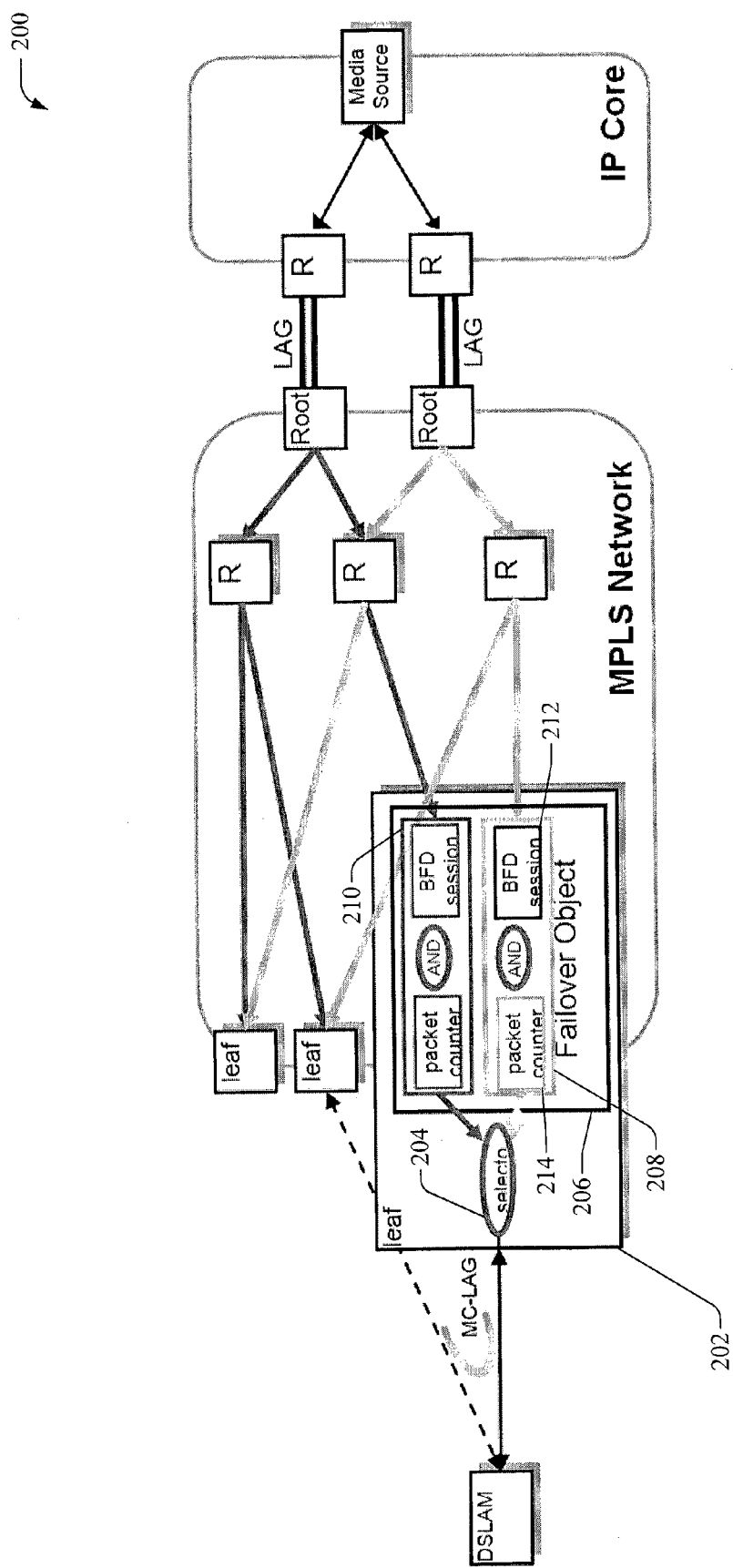
FIG. 2 depicts a network providing a plurality of communication paths between multicast trees including a source monitoring component embedded in a leaf of a multicast tree.

Looking first to FIG. 2, a diagram 200 of an exemplary embodiment of a system for determining the status of a multicast tree and switching to a different multicast tree communication path if the status indicates a problem with the current multicast tree communication path is illustrated. The exemplary embodiment includes a leaf node 202 of a multiprotocol label switching (MPLS) network, a comparator/selector 204, a failover object 206, a counter object 208, 210 including a bi-directional forward detection (BFD) detector 212 and a multicast tree packet counter 214. It should be noted that each leaf node on the MPLS network can contain the aforementioned components and operate independently of all other leaf nodes and root nodes of the MPLS network with respect to determining when a multicast tree communication path switch should occur.

Next in the exemplary embodiment, after a predefined interval, a count of the number of BFD packets received by the BFD detector 212 is compared to a count of the number of other packets (including the BFD packets) received by the multicast tree packet counter 214 and if the two counts are equal then a determination is made that the current multicast tree communication path is experiencing a source failure and a transition to a backup multicast tree communication path is performed. It should be noted in the exemplary embodiment that the multicast tree packet counter 214 can include all packets received on the multicast tree communication path or a subset of packets received as long as the subset includes the BFD packets and some other set of packets. It should further be noted that the subset of packets can be identified by a demultiplexer such as internal LSP label, PW or VLAN ID. It should further be noted that the predefined interval can include, but is not limited to, a time based interval or a packet based interval such as the interval between two or more BFD packets. It should also be noted that performing the transition to another multicast tree communication path can include but is not limited to sending a request to the protection control logic to switch to the secondary multicast tree communication path for this particular leaf node.

Figure 3:
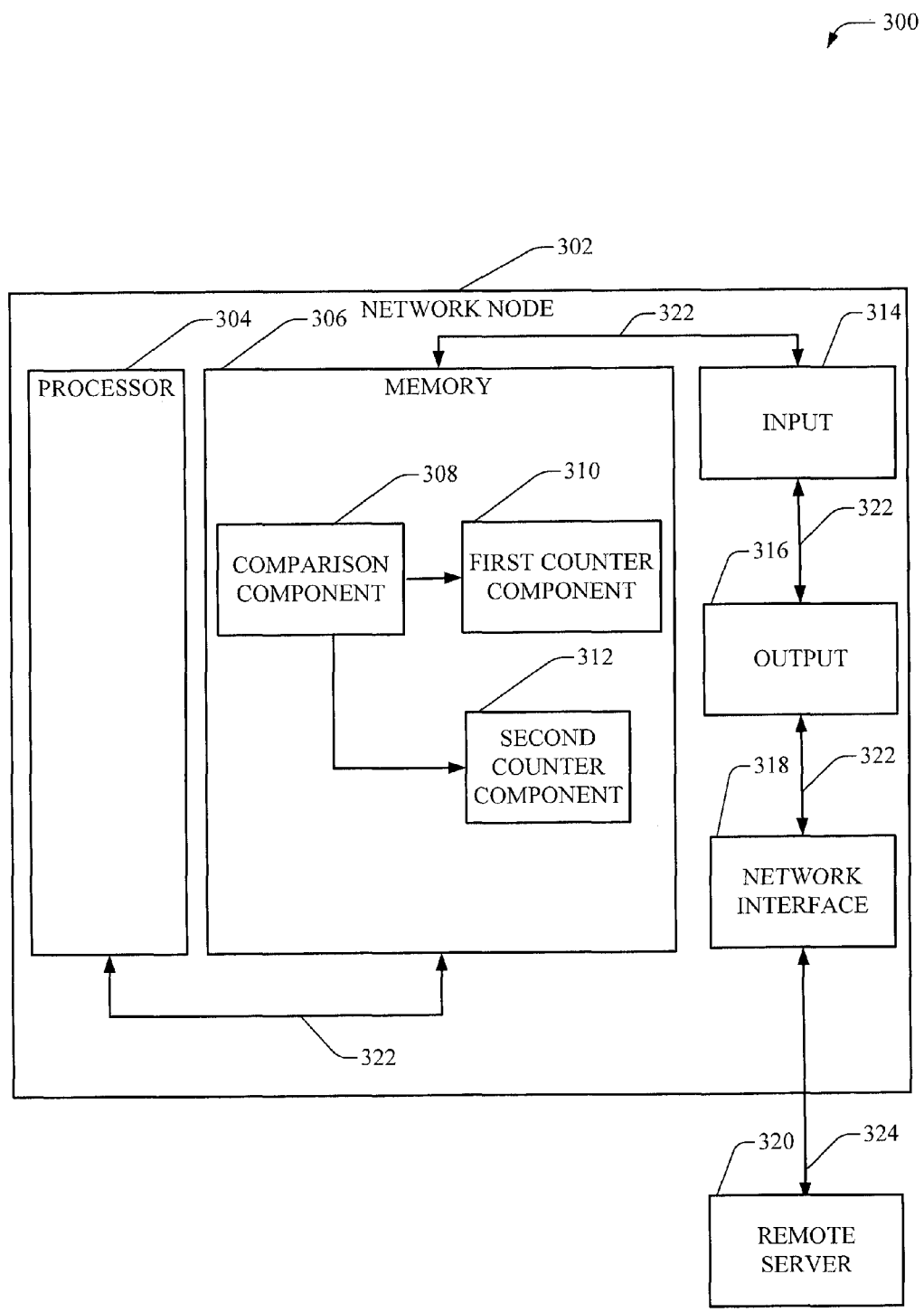
FIG. 3 depicts an exemplary computing environment including a network node with a processor, memory, a first counter component, a second counter component, a counter comparison component and a network interface component and a server component.

Looking now to FIG. 3 and another exemplary embodiment 300, is a network node 302 for providing a fast detection of the failure of a multicast tree communication path and the switch to a secondary multicast tree communication path. The exemplary embodiment network node 302 includes a processor component 304, a memory component 306, a comparison component 308, a first counter component 310 and a second counter component 312. It should be noted in the exemplary embodiment, that a fast multicast tree communication path failure detection and changeover, as provided by this exemplary embodiment, should be less than fifty milliseconds. It should further be noted that one of the counters, first counter component 310 for example, is counting only communication path failure detection packets, including but not limited to BFD packets, while the other counter, second counter component 312 for example, is counting both the BFD packets and other packets arriving on the multicast tree communication path. It should also be noted that a network node can be a leaf node and that each leaf node can contain the aforementioned components and operate independently of all other leaf nodes with regard to monitoring a multicast tree communication path and determining when a multicast tree communication path has failed.

In another aspect of the exemplary embodiment, on a predefined interval a comparison component 308 can obtain the values from first counter component 310 and second counter component 312 and analyze the counter values to determine if the current multicast tree communication path has failed. It should be noted in the exemplary embodiment that the predefined interval can be time based or event based. It should also be noted in the exemplary embodiment that an event based predefined interval can be the arrival of two (or more) consecutive communication path failure detection packets. Next in the exemplary embodiment, the comparison component 308 analyzes the counters by comparing them to determine if any packets other than the communication path failure detection packets have arrived. If the exemplary comparison component 308 determines that the only packets arriving are communication path failure detection packets then the comparison component 308 acts to change the multicast tree communication path to the secondary multicast tree communication path.

Further, FIG. 3 illustrates an example of a suitable computing system environment 300 in which the claimed subject matter can be implemented, although as made clear above, the computing system environment 300 is only one example of a suitable computing environment for an exemplary embodiment and is not intended to suggest any limitation as to the scope of use or functionality of the claimed subject matter. Further, the computing environment 300 is not intended to suggest any dependency or requirement relating to the claimed subject matter and any one or combination of components illustrated in the example computing environment 300.

Looking again to FIG. 3, an example of a device for implementing the previously described innovation includes a general purpose computing device in the form of a computer 302. Components of computer 302 can include, but are not limited to, a processing unit 304, a system memory 306, and a system bus 322 that couples various system components including the system memory to the processing unit 304. The system bus 322 can be any of several types of bus structures including a memory bus or memory controller, a peripheral bus, and a local bus using any of a variety of bus architectures.

Computer 302 can include a variety of computer readable media. Computer readable media can be any available media that can be accessed by computer 302. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 302. Communication media can embody computer readable instructions, data structures, program modules or other data in a modulated data signal such as a carrier wave or other transport mechanism and can include any suitable information delivery media.

The system memory 306 can include computer storage media in the form of volatile and/or nonvolatile memory such as read only memory (ROM) and/or random access memory (RAM). A basic input/output system (BIOS), containing the basic routines that help to transfer information between elements within computer 302, such as during start-up, can be stored in memory 306. Memory 306 can also contain data and/or program modules that are immediately accessible to and/or presently being operated on by processing unit 304. By way of non-limiting example, memory 306 can also include an operating system, application programs, other program modules, and program data.

The computer 302 can also include other removable/non-removable and volatile/nonvolatile computer storage media. For example, computer 302 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 322 through a non-removable memory interface such as an interface, and a magnetic disk drive or optical disk drive can be connected to the system bus 322 by a removable memory interface, such as an interface.

A user can enter commands and information into the computer 302 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 304 through user input 314 and associated interface(s) that are coupled to the system bus 322, but can be connected by other interface and bus structures, such as a parallel port, game port or a universal serial bus (USB).

A graphics subsystem can also be connected to the system bus 322. In addition, a monitor or other type of display device can be connected to the system bus 322 through an interface, such as output interface 316, which can in turn communicate with video memory. In addition to a monitor, computers can also include other peripheral output devices, such as speakers and/or printing devices, which can also be connected through output interface 316.

The processing unit 304 can comprise a plurality of processing cores providing greater computational power and parallel computing capabilities. Further, the computing environment 300 can contain a plurality of processing units providing greater computational power and parallel computing capabilities. It should be noted that the computing environment 300 can also be a combination of multi-processor and multi-core processor capabilities.

The computer 302 can operate in a networked or distributed environment using logical connections to one or more other remote computers, such as remote server 320, which can in turn have media capabilities different from device 302. The remote server 320 can be a personal computer, a server, a router, a network PC, a peer device or other common network node, and/or any other remote media consumption or transmission device, and can include any or all of the elements described above relative to the computer 302. The logical connections depicted in FIG. 3 include a network 324, such as a local area network (LAN) or a wide area network (WAN), but can also include other networks/buses.

When used in a LAN networking environment, the computer 302 is connected to the LAN 324 through a network interface 318 or adapter. When used in a WAN networking environment, the computer 302 can include a communications component, such as a modem, or other means for establishing communications over a WAN, such as the Internet. A communications component, such as a modem, which can be internal or external, can be connected to the system bus 322 through the user input interface at input 314 and/or other appropriate mechanism.

In a networked environment, program modules depicted relative to the computer 302, or portions thereof, can be stored in a remote memory storage device. It should be noted that the network connections shown and described are exemplary and other means of establishing a communications link between the computers can be used.

Figure 4:
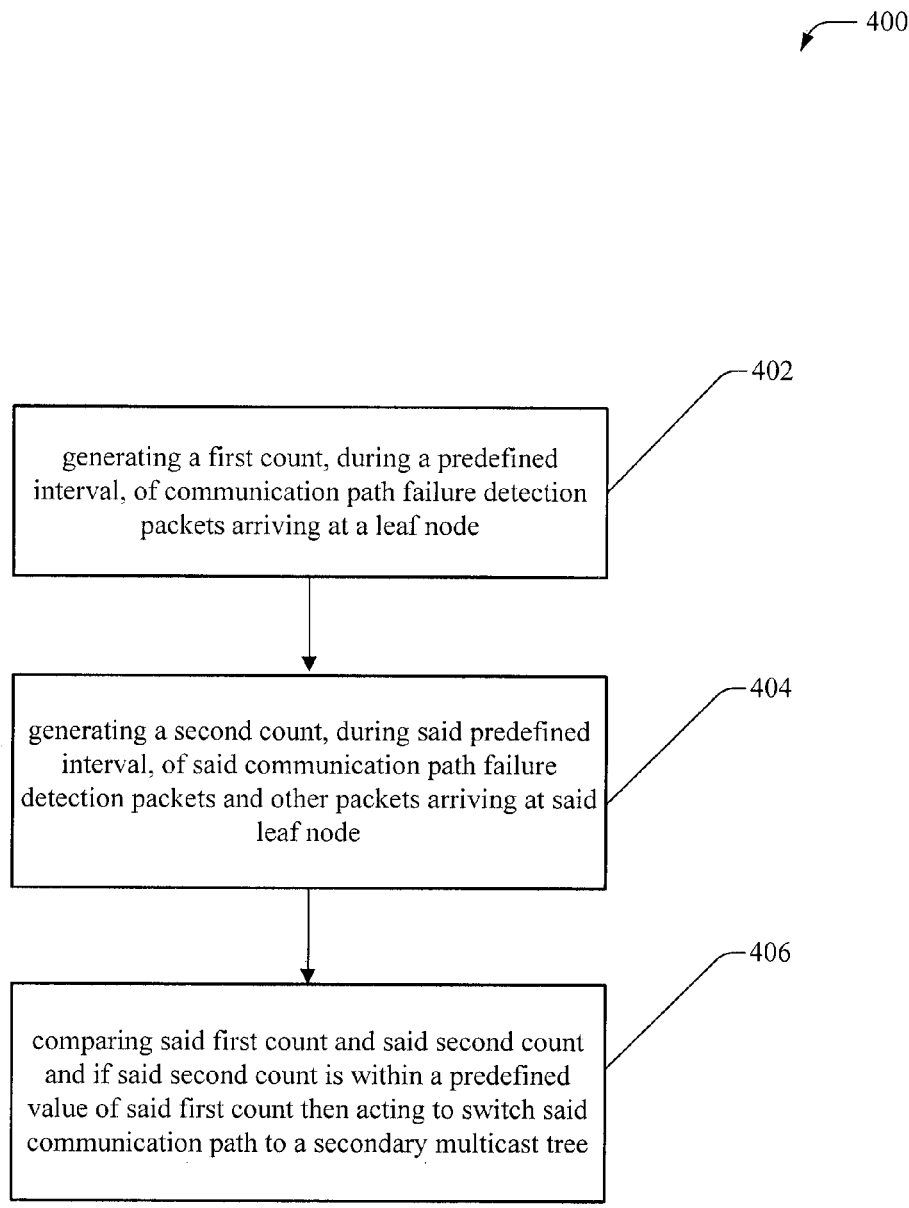
FIG. 4 depicts a method for switching communication paths between multicast trees.

Turning now to FIG. 4, an exemplary method embodiment 400 based on performing a fast switch between multicast tree communication paths when a communication path failure is detected is depicted. Starting at exemplary method embodiment step 402, a first count is generated, during a predefined interval, of communication path failure detection packets arriving at a leaf node. It should be noted in the exemplary embodiment that the predefined interval can be the arrival of two (or more) consecutive communication path failure packets. Further in the exemplary embodiment, it should be noted that a predefined time interval can be adopted.

Continuing at step 404 of the exemplary embodiment, a second count is generated, during the predefined interval, of communication path failure detection packets and other packets arriving at the leaf node. It should be noted in the exemplary embodiment that the other packets can include all arriving packets or a subset of arriving packets in addition to the communication path failure detection packets.

Next at step 406 of the exemplary embodiment, the first count is compared to the second count and if the second count is within a predefined difference of the first count then an action is taken to switch from the current multicast tree communication path to a secondary multicast tree communication path. It should be noted that the predefined difference can be zero, i.e., the first count and the second count are equal.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method, stored in a memory and executing on a processor or a specific purpose network processor, for switching a communication path between multicast trees, said method comprising:
generating a first count, during a predefined interval, of communication path failure detection packets arriving at a leaf node;
generating a second count, during said predefined interval, of said communication path failure detection packets and other packets arriving at said leaf node; and
comparing said first count and said second count and if said second count is within a predefined value of said first count then acting to switch said communication path to a secondary multicast tree.

2. The method of claim 1, wherein said communication path failure detection packets are bi-directional forwarding detection (BFD) packets.

3. The method of claim 1, wherein said predefined interval is the interval between the arrival of two consecutive communication path failure detection packets.

4. The method of claim 1, wherein said first count is generated by said leaf node.

5. The method of claim 1, wherein said second count is generated by said leaf node.

6. The method of claim 1, wherein said acting comprises requesting protection control logic to switch to said secondary multicast tree.

7. The method of claim 1, wherein a source monitoring object comprises generating said first count and said second count.

8. The method of claim 7, further comprising maintaining a first source monitoring object for a primary multicast tree and a second source monitoring object for a secondary multicast tree.

9. The method of claim 1, wherein said predefined value is zero.

10. The method of claim 1, further comprising detecting the loss of consecutive communication path failure detection packets and triggering said switch of said communication path to said secondary multicast tree when said loss is detected.

11. A node on a network for minimizing the time required to switch a communication path between multicast trees, said node comprising:
a processor for executing computer instructions and a memory for storing said computer instructions wherein said computer instructions further comprise:
a first counter component for counting the arrival of communication path failure packets at said node over a predefined interval;
a second counter component for counting the arrival of said communication path failure packets and other packets arriving at said node over said predefined interval; and
a comparison component for comparing a first count associated with said first counter component and a second count associated with said second counter component and sending a request to switch to a second multicast tree when the difference between said first count and said second count is a predefined value.

12. The node of claim 11, wherein said communication path failure detection packets are bi-directional forwarding detection (BFD) packets.

13. The node of claim 11, wherein said predefined interval is the interval between the two consecutive communication path failure packets.

14. The node of claim 11, wherein said node is a leaf node on said multicast tree.

15. The node of claim 11, wherein said predefined value is zero.

16. The node of claim 11, wherein said request is sent to a protection control logic component.

17. The node of claim 16, wherein said protection control logic component is on a different node.

18. A system for protecting a communication path from a root node to a leaf node in a multiprotocol label switching (MPLS) network, said system comprising:
a plurality of MPLS root nodes connected to a plurality of routers associated with a second network;
a plurality of MPLS leaf nodes wherein each leaf node further comprises:
a processor for executing computer instructions and a memory for storing said computer instructions wherein said computer instructions further comprise:
a first counter component for counting the arrival of communication path failure packets at said node over a predefined interval;
a second counter component for counting the arrival of said communication path failure packets and other packets arriving at said node over said predefined interval; and
a comparison component for comparing a first count associated with said first counter component and a second count associated with said second counter component and sending a request to switch to a second multicast tree when said first count and said second count are within a predefined range; and a plurality of MPLS routers connecting said plurality of leaf nodes to said plurality of root nodes.

19. The system of claim 18, wherein said communication path failure detection packets are bi-directional forwarding detection (BFD) packets.

20. The system of claim 18, wherein said second network is an internet protocol (IP) network.

21. The system of claim 18, wherein said predefined range is zero.

* * * * *